95-87 SR

C0036 OR T866012

DEFENSIVE PUBLICATION

UNITED STATES PATENT OFFICE

Published at the request of the applicant or owner in accordance with the Notice of Apr. 11, 1968, 849 O.G. 1221. Identification is by serial number of the application and the heading indicates the number of pages of specification, including claims, and of sheets of drawing contained in the application as originally filed. The file of this application is available to the public for inspection; reproduction may be purchased for 30 cents per sheet.

Applications published under the Defensive Publication Program have not been examined as to the merits of alleged invention. The Patent Office makes no assertion as to the novelty of the disclosed subject matter.

PUBLISHED SEPTEMBER 2, 1969

866 O.G. 23

821,426
CHROMATOGRAPHIC SEPARATION

Dennis Jack Royer, 1012 E. Hartford, Ponca City, Okla. 44601

Filed May 2, 1969. Published Sept. 2, 1969
Int. Cl. B01d *15/08*
U.S. Cl. 55—67
1 Sheet Drawing. 5 Pages Specification

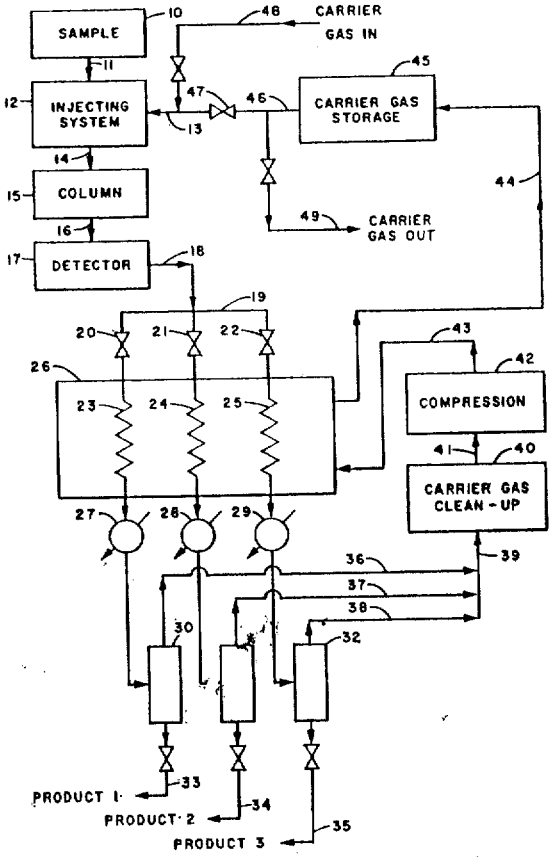

Separated effluent product slugs from a chromatographic column operated at elevated temperature are passed through indirect heat exchange to carrier gas separation zones; the separated carrier gas is then cleaned, compressed, and passed to the aforementioned indirect heat exchange.

95-87 SR
C0036 OR T866012
Sept. 2, 1969
D. J. ROYER
CHROMATOGRAPHIC SEPARATION
Filed May 2, 1969
DEF. PUB.
821426
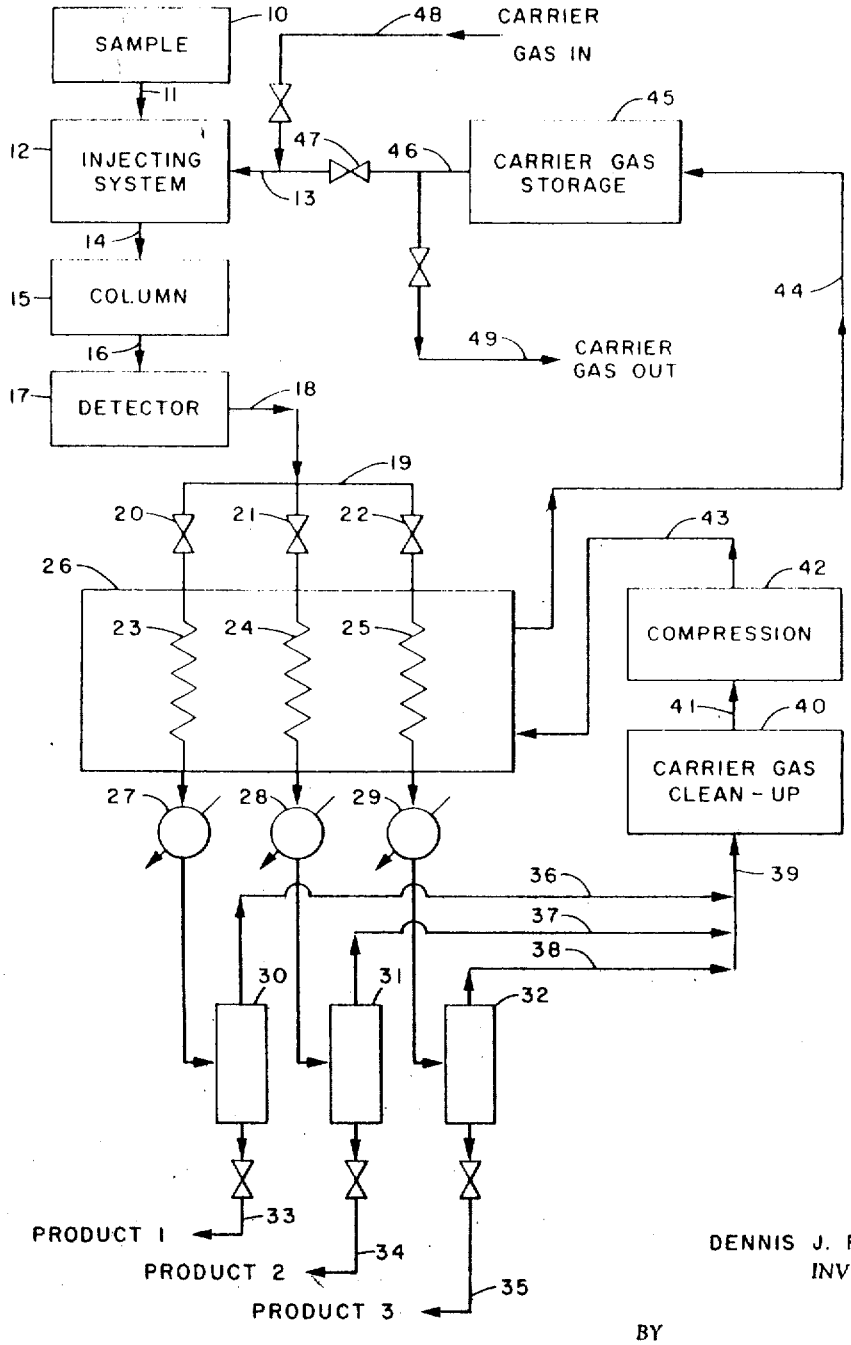
DENNIS J. ROYER
INVENTOR.
BY
ATTORNEY